May 22, 1962 L. F. DEISE 3,036,264
MAGNETIC AMPLIFIER
Filed June 27, 1957

WITNESSES:
Bernard R. Gieguay
Myron E. Click

INVENTOR
Louis F. Deise
BY
F. E. Browder
ATTORNEY

United States Patent Office 3,036,264
Patented May 22, 1962

3,036,264
MAGNETIC AMPLIFIER
Louis F. Deise, Baltimore, Md., assignor to Westinghouse Electric Corporation, East Pittsburgh, Pa., a corporation of Pennsylvania
Filed June 27, 1957, Ser. No. 668,555
6 Claims. (Cl. 323—89)

This invention relates to magnetic amplifiers in general and in particular to linear balanced magnetic amplifiers.

In a conventional linear balanced magnetic amplifier, the output of one pair of saturable reactors is usually balanced against the output of another pair of saturable reactors so that with proper bias adjustment and zero control signal the output across a load is zero. Unless the resistances, rectifiers and saturable reactor cores are perfectly matched, unequal changes in the magnetic amplifier, i.e., changes caused by temperature, will unbalance the amplifier and an output will appear across the load. In many applications this zero signal output, known as "zero drift," must be held within very small limits.

It is, accordingly, an object of this invention to provide an improved magnetic amplifier.

It is a further object of this invention to provide an improved magnetic amplifier wherein the amount of zero drift is limited.

Further objects of this invention will become apparent from the following description, when taken in conjunction with the accompanying drawings. In said drawings, for illustrative purposes only, are shown preferred forms of the invention.

Figure 1:
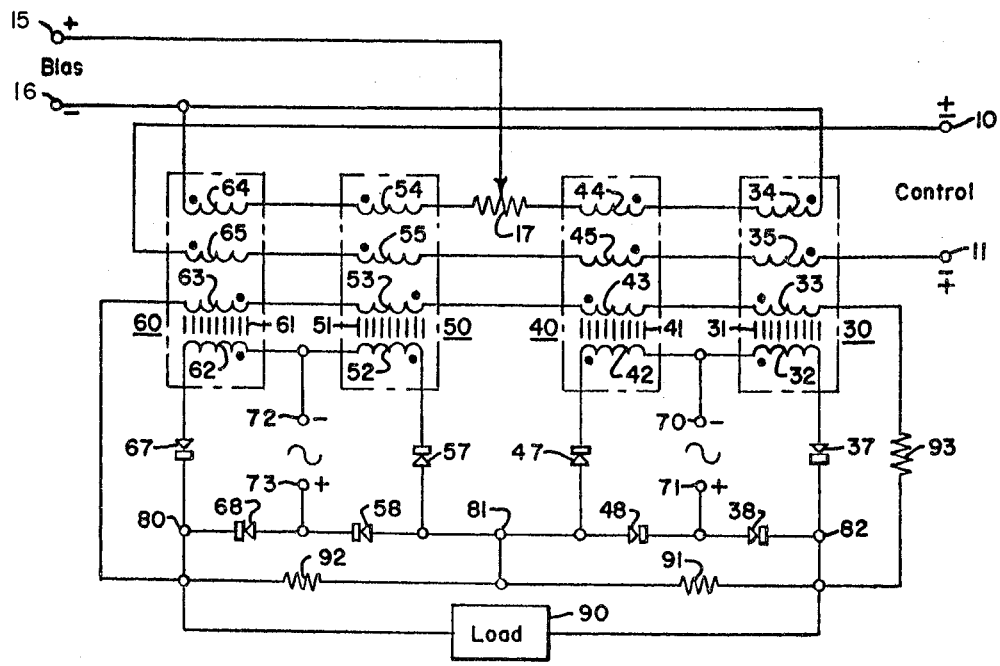
Figure 2:
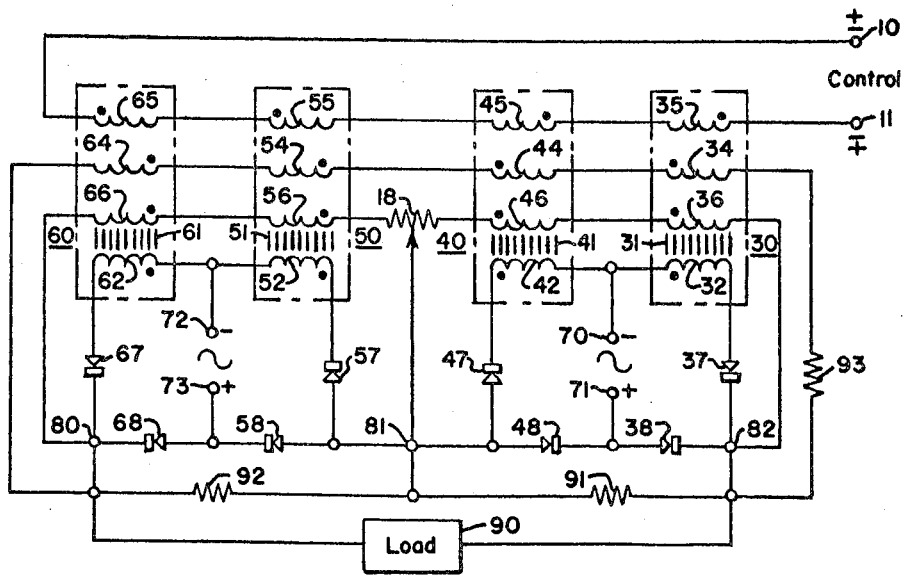

FIGURE 1 is a schematic diagram of one form of a conventional balanced magnetic amplifier; and FIG. 2 is a schematic diagram of a linear balanced magnetic amplifier embodying the teachings of this invention.

In the drawings, the manner in which the windings have been wound on the magnetic core members has been denoted by the polarity dot convention indicating like points of instantaneous polarity. The polarity dot convention denotes direction of saturation. That is, current flowing into the polarity dot end of a winding will drive the inductively associated core toward positive saturation. Current flowing out of the polarity dot end of the winding will drive the inductively associated core away from positive saturation.

Referring to FIG. 1, there is illustrated a conventional balanced magnetic amplifier. In general, this magnetic amplifier comprises two pairs of saturable reactors 30, 40 and 50, 60, flux-regulating means including a bias circuit connected to the terminals 15 and 16 and a control circuit connected to the terminals 10 and 11, means for applying an alternating-current voltage to the reactors 30, 40, 50 and 60, and means for connecting a load 90.

The saturable reactor 30 comprises a magnetic core member 31 having inductively disposed thereon a load winding 32, a feed-back winding 33, a bias winding 34 and a control winding 35. The saturable reactor 40 comprises a magnetic core member 41 having inductively disposed thereon a load winding 42, a feed-back winding 43, a bias winding 44 and a control winding 45. The load windings 32 and 42 of the saturable reactors 30 and 40, respectively, have a common terminal 70. The load winding 32, a rectifier 37, a terminal 82 and a rectifier 38 are connected in series circuit relationship between the terminal 70 and a terminal 71. The load winding 42, a rectifier 47, a terminal 81 and a rectifier 48 are connected in series circuit relationship between the terminals 70 and 71. An alternating current voltage source is to be applied to the terminals 70 and 71.

The saturable reactor 50 comprises a magnetic core member 51 having inductively disposed thereon a load winding 52, a feed-back winding 53, a bias winding 54 and a control winding 55. The saturable reactor 60 comprises a magnetic core member 61 having inductively disposed thereon a load winding 62, a feed-back winding 63, a bias winding 64 and a control winding 65. The load windings 52 and 62 of the reactors 50 and 60, respectively, have a common terminal 72. The load winding 52, a rectifier 57, the terminal 81 and a rectifier 58 are connected in series circuit relationship between the terminal 72 and a terminal 73. The load winding 62, a rectifier 67, a terminal 80 and a rectifier 68 are connected in series circuit relationship between the terminals 72 and 73. An alternating current source is to be applied to the terminals 72 and 73.

A resistor 91 is connected between the terminals 82 and 81. A resistor 92 is connected between the terminals 81 and 80. A load 90 is connected to the terminals 82 and 80.

The flux-regulating means for the reactors 30, 40, 50 and 60 includes a bias circuit and a control circuit. The bias circuit comprises the bias winding 34 of the reactor 30, the bias winding 44 of the reactor 40 and a portion of an adjustable tapped resistor 17, connected in parallel circuit relationship with the bias winding 54 of the reactor 50, the bias winding 64 of the reactor 60 and the remaining portion of the adjustable tapped resistor 17 between the terminals 15 and 16. The control circuit comprises the control winding 35 of the reactor 30, the control winding 45 of the reactor 40, the control winding 55 of the reactor 50 and the control winding 65 of the reactor 60 connected in series circuit relationship between the terminals 10 and 11.

A negative feed-back circuit comprising a resistor 93, the feed-back winding 33 of the reactor 30, the feed-back winding 43 of the reactor 40, the feed-back winding 53 of the reactor 50 and the feed-back winding 63 of the reactor 60 connected in series circuit relationship between the terminals 80 and 82.

In operation, the alternating-current voltages applied to the terminals 70, 71 and 72, 73 are of the same frequency and phase. The polarity shown for these alternating-current voltages in FIG. 1 indicates like instantaneous polarities. Therefore, on the first half-cycle of operation when the terminal 71 is at a positive polarity with respect to the terminal 70, current will flow from the terminal 71 through the rectifier 38 in the forward direction, the terminal 82, the resistor 91, the rectifier 47 in the forward direction and the load winding 42 of the reactor 40 to the terminal 70. On this same half-cycle, when the terminal 73 is at a positive polarity with respect to terminal 72, current will flow from the terminal 73 through the rectifier 68 in the forward direction, the terminal 80, the resistor 92, the rectifier 57 in the forward direction and the load winding 52 of the reactor 50 to the terminal 72.

On the next half-cycle when the terminal 70 is at a positive polarity with respect to the terminal 71, current will flow from the terminal 70 through the load winding 32 of the reactor 30, the rectifier 37 in the forward direction, the terminal 82, the resistor 91 and the rectifier 48 in the forward direction to the terminal 71. On this same half-cycle, when the terminal 72 is at a positive polarity with respect to the terminal 73, current will flow from the terminal 72 through the load winding 62 of the reactor 60, the rectifier 67 in the forward direction, the terminal 80, the resistor 92 and the rectifier 58 in the forward direction to the terminal 73. The magnitudes of the alternating-current voltages are sufficient to drive the reactors 30, 40, 50 and 60 just to positive saturation.

Assuming a normal operation wherein a direct current, with polarity as shown in FIG. 1, of sufficient magnitude to bias each pair of saturable reactors 30, 40 and 50, 60 to operate in the middle of its control range, the output on each half-cycle at the terminals 82 and 80 of each pair of reactors will theoretically be of the same potential and there will be a zero output across the load 90. Therefore, with a zero control signal applied to the terminals 10 and 11, the output across the load 90 will remain zero.

The application of a control signal to the control terminals 10 and 11 will unbalance the magnetic amplifier and there will be an output across the load 90. A reversal of polarity of the control signal at the terminals 10 and 11 will unbalance the magnetic amplifier in the opposite direction and there will be an output to the load 90 of the opposite polarity.

With a zero control signal, unless the resistance, rectifiers and saturable reactor cores are perfectly matched, changes in supply voltage, bias, or temperature will cause the amplifier to become unbalanced and some output will appear across the load 90. In the prior art, negative feedback has been applied around the amplifier, which, though sacrificing gain reduces the "zero drift" and improves the input-output linearity. In the apparatus illustrated in FIG. 1, this negative feedback is applied through the feedback circuit connected to the terminals 82 and 80 as may be seen by an examination of the polarity dot markings of the feed-back windings. An unbalance of the magnetic amplifier at either the terminal 82 or 80 will cause a current flow in the feedback circuit which tends to drive that pair or saturable reactors back toward a zero quiescent current. Although the apparatus in FIG. 1 was satisfactory for some applications, there are many applications wherein this zero signal output must be held within very small limits. An improved magnetic amplifier incorporating the above desired feature is illustrated in FIG. 2.

Referring to FIG. 2, there is illustrated a linear balanced magnetic amplifier embodying the teachings of this invention, in which like components of FIGS. 1 and 2 have been given the same reference characters. The main distinction between the apparatus illustrated in FIGS. 1 and 2 is that in FIG. 2, a feedback bias circuit around each pair of saturable reactors has replaced the bias circuit connected to the terminals 15 and 16 of FIG. 1. A feed-back winding 36 inductively disposed on the reactor 30 and a feed-back winding 46 inductively disposed on a reactor 40 have been connected in series circuit relationship through a portion of an adjustable impedance means, shown in FIG. 2 as an adjustable tapped resistor 18, between the terminals 82 and 81. A feedback winding 56 inductively disposed on the reactor 50 and a feedback winding 66 inductively disposed on the reactor 60 have been connected in series through the remaining portion of the adjustable resistor 18 between the terminals 81 and 80. The flux-regulating means for the reactors 30, 40, 50 and 60 now comprises the control circuit connected to the terminals 10 and 11 and the feedback bias circuit just described.

In general, the operation of the magnetic amplifier illustrated in FIG. 2 is similar to the operation of the system shown in FIG. 1. In FIG. 2, the feed-back current around each pair of saturable reactors through the individual feed-back windings 36, 46 and 56, 66 may be easily adjusted and balanced so that with a zero input signal to the terminals 10 and 11 each pair of the saturable reactors is operating in the middle of its control range and the output of the load 90 is zero. In addition, this method of biasing each pair of saturable reactors is also sensitive to an unbalance of the magnetic amplifier at zero control signal, thus maintaining the zero drift much closer to zero. Additional feedback is applied around the full amplifier through the feedback windings 34, 44, 54 and 64 connected to the terminals 80 and 82 to obtain the same overall gain as with the conventional amplifier illustrated in FIG. 1.

The circuit illustrated in FIG. 2 reduces the zero drift due to temperature and line voltage variations and also eliminates the need for a bias supply rectifier to obtain direct current. Experiments made comparing the conventional circuit of FIG. 1 and the invention illustrated in FIG. 2 have been made. The same saturation reactors and rectifiers were used in the two circuits and both amplifiers were adjusted to have the same gain. The conventional amplifier of FIG. 1 had approximately three times as much zero drift as the magnetic amplifier embodying the teachings of this invention illustrated in FIG. 2, with various changes of line voltage and temperature. The input-output linearity and response time are approximately the same for both amplifiers.

In conclusion, it is pointed out that while the illustrated example constitutes a practical embodiment of my invention, I do not limit myself to the exact details shown, since modification of the same may be varied without departing from the spirit of this invention.

I claim as my invention:

1. In a magnetic amplifier, in combination, a first pair and a second pair of saturable reactors, a load circuit for each said pair of saturable reactors, flux-regulating means for said magnetic amplifier comprising a control circuit for both said pairs of saturable reactors, and negative feed-back bias means connected across each said load circuit for each said pair of saturable reactors, a feedback circuit for said magnetic amplifier connected across both said load circuits, and means for connecting a load across both said load circuits.

2. In a magnetic amplifier, in combination, a first pair and a second pair of saturable reactors, a load circuit for each said pair of saturable reactors, flux-regulating means for said magnetic amplifier comprising a control circuit for both said pairs of saturable reactors, and negative feed-back bias means connected across each said load circuit for each said pair of saturable reactors, said feed-back bias means comprising feed-back winding means inductively disposed on each said saturable reactor, a feedback circuit for said magnetic amplifier connected across both said load circuits, and means for connecting a load across both said load circuits.

3. In a magnetic amplifier, in combination, a first pair and a second pair of saturable reactors, a load circuit for each said pair of saturable reactors, flux-regulating means for said magnetic amplifier comprising a control circuit for both said pairs of saturable reactors, and negative feed-back bias means connected across each said load circuit for each said pair of saturable reactors, said feed-back bias means comprising feed-back winding means inductively disposed on each said saturable reactor, said feed-back bias means for said first pair of saturable reactors being coupled to said feed-back bias means for said second pair of saturable reactors by adjustable impedance means, a negative feed-back circuit for said magnetic amplifier connected across both said load circuits, and means for connecting a load across both said load circuits.

4. In a magnetic amplifier, in combination, a first pair and a second pair of saturable reactors, a load circuit for each pair of saturable reactors, each said load circuit comprising load windings inductively disposed on each said saturable reactor and means for applying an alternating-current voltage to said load circuit, flux-regulating means for said magnetic amplifier comprising a control circuit for both said pairs of saturable reactors, and negative feed-back bias means connected across each said load circuit for each said pair of saturable reactors, said feed-back bias means comprising feed-back winding means inductively disposed on each said saturable reactor, said feed-back bias means for said first pair of saturable reactors being coupled to said feed-back bias means for said second pair of saturable reactors by adjustable impedance means, a feed-back circuit for said magnetic amplifier connected across both said load circuits, and means for connecting a load across both said load circuits.

5. In a magnetic amplifier, in combination, a first pair and a second pair of saturable reactors, a load circuit for each said pair of saturable reactors, each said load circuit comprising load windings inductively disposed on each said saturable reactor and unidirectional current means poled to permit application of an alternating-current voltage to said windings on alternate half-cycles, flux-regulating means for said magnetic amplifier comprising a control circuit for both said pairs of saturable reactors, and negative feed-back bias means connected across each said load circuit for each said pair of saturable reactors, said feed-back bias means comprising feed-back winding means inductively disposed on each said saturable reactor, said feed-back bias means for said first pair of saturable reactors being coupled to said feed-back bias means for said second pair of saturable reactors by adjustable impedance means, a feed-back circuit for said magnetic amplifier connected across both said load circuits, and means for connecting a load across both said load circuits.

6. In a magnetic amplifier, in combination, a first pair and a second pair of saturable reactors, a load circuit for each said pair of saturable reactors, each said load circuit comprising load windings inductively disposed on each said saturable reactor and unidirectional current means poled to permit application of an alternating-current voltage to said windings on alternate half-cycles, flux-regulating means for said magnetic amplifier comprising a control circuit for both said pairs of saturable reactors, and negative feed-back bias means connected across each said load circuit for each said pair of saturable reactors, said control circuit comprising control winding means inductively disposed on each said saturable reactor, said feed-back bias means comprising feed-back winding means inductively disposed on each said saturable reactor, said feed-back bias means for said first pair of saturable reactors being coupled to said feed-back bias means for said second pair of saturable reactors by adjustable impedance means, a feed-back circuit for said magnetic amplifier connected across both said load circuits, and means for connecting a load across both said load circuits.

References Cited in the file of this patent
UNITED STATES PATENTS

| | | |
|---|---|---|
| 2,338,423 | Geyger | Jan. 4, 1944 |
| 2,817,807 | Weir | Dec. 24, 1957 |
| 2,923,877 | McKenney | Feb. 2, 1960 |

FOREIGN PATENTS

| | | |
|---|---|---|
| 1,113,321 | France | Dec. 5, 1955 |

OTHER REFERENCES

Publication: "Magnetic Amplifiers of the Balance Detector Type—Their Basic Principles, Characteristics, and Applications," by W. A. Geyger; AIEE Proceedings, Section TO–93, volume 70, 1951; page 10.